United States Patent [19]

Leir et al.

[11] Patent Number: 5,576,356
[45] Date of Patent: Nov. 19, 1996

[54] CATIONICALLY CO-CURABLE POLYSILOXANE RELEASE COATINGS

[75] Inventors: Charles M. Leir, Falcon Heights; William R. Berggren, Woodbury; William R. Bronn, Maplewood; David J. Kinning; Olester Benson, Jr., both of Woodbury, all of Minn.

[73] Assignee: Minnesota Mining and Manufacturing Company, Saint Paul, Minn.

[21] Appl. No.: 333,354

[22] Filed: Nov. 2, 1994

Related U.S. Application Data

[63] Continuation of Ser. No. 955,486, Oct. 2, 1992, abandoned.
[51] Int. Cl.[6] .............................. C08F 2/50; C08L 83/07; C08L 83/06; C08L 83/10
[52] U.S. Cl. .............................. 522/31; 522/99; 522/148; 522/149; 522/170; 522/172
[58] Field of Search .............................. 522/99, 148, 170, 522/172, 31, 149

[56] References Cited

U.S. PATENT DOCUMENTS

| | | | |
|---|---|---|---|
| 4,046,795 | 9/1977 | Martin | 260/448.2 |
| 4,049,861 | 9/1977 | Nozari | 428/220 |
| 4,058,400 | 11/1977 | Crivello | 96/86 |
| 4,070,526 | 1/1978 | Colquhoun et al. | 428/537 |
| 4,101,513 | 7/1978 | Fox et al. | 526/193 |
| 4,201,808 | 5/1980 | Cull et al. | 428/40 |
| 4,256,828 | 3/1981 | Smith | 430/280 |
| 4,279,717 | 7/1981 | Eckberg et al. | 204/159.13 |
| 4,313,988 | 2/1982 | Koshar et al. | 428/40 |
| 4,547,431 | 10/1985 | Eckberg | 428/413 |
| 4,558,147 | 12/1985 | Eckberg et al. | 556/427 |
| 4,563,539 | 1/1986 | Gornowicz et al. | 556/421 |
| 4,576,999 | 3/1986 | Eckberg | 525/476 |
| 4,748,043 | 5/1988 | Seaver et al. | 427/30 |
| 4,783,430 | 11/1988 | Su | 501/96 |
| 4,952,657 | 8/1990 | Riding et al. | 528/27 |
| 4,988,741 | 1/1991 | Stein | 522/31 |
| 5,217,805 | 6/1993 | Kessel et al. | 522/172 |
| 5,364,888 | 11/1994 | Aoki et al. | 522/170 |

Primary Examiner—Susan W. Berman
Attorney, Agent, or Firm—Gary L. Griswold; Walter N. Kirn; Janice L. Dowdall

[57] ABSTRACT

The invention provides a radiation curable release coating composition comprising:

(a) about 1 to about 50 percent by weight of a cationically reactive polydiorganosiloxane liquid rubber having the following formula:

$$M-O-[\underset{\underset{R}{|}}{\overset{\overset{R}{|}}{Si}}-O]_a-[\underset{\underset{E}{|}}{\overset{\overset{R}{|}}{Si}}-O]_b-M \qquad \text{Formula I}$$

wherein
R are monovalent moieties which can be the same or different selected from the group consisting of alkyl, substituted alkyl, aryl, and substituted aryl wherein at least about 50% of the total number of silicon atoms have two methyl groups bonded thereto;
E is an organic monovalent functional group comprising from about 1 to about 20 carbon atoms having at least one cationically co-reactive functional group;
a and b both represent integers, wherein the sum of a plus b is an integer of about 10 to about 1200;
b has a value ranging from about 0 to about $0.2a$;
a is an integer of about 10 to about 1000; and
M is a silyl group which must contain at least one cationically co-reactive functional group when b=0 and may contain at least one cationically co-reactive group when b is greater than 0;

(b) about 50 to about 99 percent by weight of at least one cationically co-reactive monomer copolymerizable with said cationically co-reactive functional group of said polydiorganosiloxane liquid rubber;
wherein the percentages of (a) and (b) are based on the total weight of (a) plus (b); and (c) about 0.5 to about 4 parts by weight of a photoactive radiation activatable cationically reactive catalyst based on the weight of (a) plus (b).

The invention also provides release coatings and methods of making release coatings.

45 Claims, No Drawings

CATIONICALLY CO-CURABLE POLYSILOXANE RELEASE COATINGS

This is a continuation of application Ser. No. 07/955,486 filed Oct. 2, 1992, now abandoned.

FIELD OF THE INVENTION

The invention relates to radiation curable siloxane release coating compositions and release coatings prepared therefrom. The release coatings provide a full range of release, from premium to tight, even though they contain low levels of siloxane polymer.

BACKGROUND OF THE INVENTION

Thin coatings of silicone polymers on substrates such as film or paper have come to form an integral component in the construction of numerous products in the pressure sensitive adhesives industry, especially in the manufacture of labels, where such coated sheets are usually referred to as release liners. The level of release, or peel force required for such applications, is in most instances very low. Silicone materials have been found to be especially well suited for this purpose due to the low tendency for pressure sensitive adhesives to adhere to surfaces coated with substantially pure polydimethylsiloxane. A number of materials have been developed which consist primarily of polydimethylsiloxane substituted with small amounts of various reactive functional groups for chemically crosslinking the liquid silicone on the substrate after coating, and which usually requires some period of heating in an oven to effect the cure before the pressure sensitive adhesive can be applied. Of course, it is essential for the performance of the final product that the silicone coating be completely cured, and that the cure be completed as quickly as possible for feasibility of manufacture.

The complete and rapid cure of silicone coatings has been a problem in the past. Recently, however, a number of reactive silicones have become available which undergo a rapid cure effected by exposure to a sufficient dose of radiation, commonly emitted from ultraviolet lights, or visible lights, electron beam (E-beam) devices or thermal devices. The selection of the radiation source depends on specific process requirements. For example, polydimethylsiloxanes substituted with small amounts of pendant acrylate groups, when combined with photoactive initiators and coated as liquid films on most substrates, upon brief exposure to radiation in an atmosphere which contains little or no oxygen crosslinks to provide solid, tack-free, premium release coatings through the free radical polymerization of the acrylic side chains, as described in U.S. Pat. No. 4,563,539 (Gornowicz et al.). Another example is that of epoxy functional silicones as described in U.S. Pat. No. 4,279,717 (Eckberg), which are commercially available from the General Electric Company. These are compositions consisting essentially of polydimethylsiloxanes in which 1–20 mole-% of the silicon atoms have been substituted with epoxyalkyl groups, preferably epoxy cyclohexyl ethyl, and small amounts of soluble catalysts, especially diaryliodonium hexafluoroantimonate. When a thin coating of this liquid formulation is applied to the substrate by a standard coating technique and then exposed to a sufficient dose of radiation, the catalyst instantly decomposes to generate traces of strong acid. This strong acid initiates the rapid cationic polymerization of the epoxy group to provide a tack-free coating, usually in a matter of seconds or less, which completely cures in a matter of minutes to hours following irradiation.

In these types of silicone release coatings, the final cured films have a structure which is essentially silicone throughout the bulk of the coating, consisting of polydimethylsiloxane segments crosslinked together into a network with small amounts of low molecular weight polycyclohexylene oxide chains. Because of this low concentration of non-silicone components, pressure-sensitive adhesives which contact these coatings release very easily, even when aged for extended periods of time at high temperatures. Heat aged peel forces from these coatings generally register in the 0.5 to 2.0 Newton per decimeter (N/dm), depending upon the particular pressure-sensitive adhesive (PSA) employed.

For many products, on the other hand, significantly higher peel forces are required than can be obtained from the pure silicone having a low content of functional groups; for example, in certain label constructions, or in release coatings for tapes in roll form (usually referred to as low adhesion backsizes). Two methods for increasing the release level of these reactive silicones have been disclosed in the patent literature. The first method involves the further substitution of silicon atoms in the polysiloxane chains with additional acrylate (U.S. Pat. No. 4,576,999, Eckberg) or epoxyalkyl groups (U.S. Pat. No. 4,313,988, Koshar), or other groups such as alkylene phenol (U.S. Pat. No. 4,952,657, Desorcie et al.). The second method is to add limited amounts of certain non-silicone co-reactive diluents to the low epoxy or acrylate functional silicones. Thus, in the case of epoxy silicones a number of suitable additives have been described, such as epoxy alkanes as described in U.S. Pat. No. 4,576,999 (Eckberg, et. al.), polyepoxide resins as in U.S. Pat. No. 4,547,431 (Eckberg), and even styrenic monomers as in U.S. Pat. No. 4,988,741 (Stein).

When small amounts of these cationically co-reactive monomers were added to the epoxy functional silicone, increases in the peel forces for removal of tape strips, roughly proportional to the amount of non-silicone component added, were observed for tape samples which were prepared by solvent casting of the pressure sensitive adhesive on the cured liner, followed by laminating a film backing to the dried psa, and then aging the tape samples. Thus, mixtures of epoxysilicone containing from 5 to about 40% by weight of reactive diluent provided cured coatings which exhibited an increasing peel force for removal of tape strips up to about 225 g/in (8.7 N/dm) at the highest loading (40%) of modifiers studied. Presumably, these added monomers efficiently co-polymerize with the silicone bonded epoxide. Based on these results and other teachings contained in the body of the prior art, it was recommended that the amounts of added reactive diluents not exceed 40% by weight of epoxysilicone, since beyond that level it was felt the release levels would climb too rapidly to be useful for pressure sensitive adhesive release purposes.

Similar findings have been described for silicone release coatings based upon other radiation-reactive functional groups in which free radical polymerization and crosslinking is used to effect the cure. U.S. Pat. No. 4,070,526 (Colquhoun et al.) discloses radiation curable compositions comprising mercaptoalkyl-substituted polydiorganosiloxane fluid, from about 1 to 50 parts by weight vinyl monomer (per 100 parts of the fluid) and, optionally, a methylvinylpolysiloxane. Upon curing, with little or no oxygen present, variable release of adhesives is said to be controllably provided. Release data for compositions containing greater than 50 parts of vinyl monomer (see Table I of U.S. Pat. No. 4,070,526) indicates that release is not reliably obtained at these higher reactive diluent levels, i.e. at lower levels of silicone. U.S. Pat. No. 4,783,490 (Eckberg et al.) discloses radiation curable compositions comprising mercapto-substituted silicon compounds, reactive co-compounds such as multifunctional acrylates, and photoinitiator. Reactive diluents, such as monofunctional acrylates, may optionally be added to control viscosity, although generally it is not desirable to add more than about 25% by weight. Co-reactive diluents, employed at levels up to about 30% by weight of the radiation-polymerizable acrylate-functional organopolysiloxane composition, are also described in U.S. Pat. No. 4,606,933 (Griswold et al.). These added diluents are desirable in aiding the adhesion of this organopolysiloxane composition to a substrate.

U.S. Pat. No. 4,201,808 (Cully et al.) discloses radiation curable release coating compositions, most commonly for paper substrates, comprising from about 10 to about 90 weight percent (based on the total weight of the composition) of "an organopolysiloxane containing an average of at least one" acryloxy and/or methacryloxy group per molecule, from about 90 to 10 weight percent of a low molecular weight free radically polymerizable acrylated polyol crosslinking agent, and from 0 to 10 weight percent of a photosensitizer. For compositions containing at least 50% of the (meth)acrylate functional organopolysiloxane, the polyol crosslinking agent is not siloxane based. But for compositions containing less than 50%, the crosslinking agent is siloxane based. To adjust viscosity, the compositions can also contain from 0.01 to about 30 weight percent of a reactive diluent, such as liquid organic monoacrylate ester.

Finally, U.S. Ser. No. 08/304,424, now U.S. Pat. No. 5,527,578 assigned to the assignee of the present case, describes a radiation curable release coating composition comprising a minor portion of acrylate-functional silicone (0.05 to 25% by weight of the composition), 5 to 60% by weight multifunctional free radically copolymerizable vinyl monomers, and 25 to 95% by weight monofunctional, free radically copolymerizable vinyl monomers. These release coating compositions provide stable reproducible levels of release in the intermediate region.

Despite the improvements in release coating technology that these radiation curable functional silicones have provided to the pressure sensitive adhesive products industry, these materials still suffer from a number of significant drawbacks which have precluded their use in many potential applications. The free radically polymerized materials (i.e., acrylate modified silicones) require an inert atmosphere to rapidly cure, conditions which are difficult to maintain in production environments, and also have a tendency to transfer silicone contaminants to adhesive surfaces. Cationically cured (i.e., epoxy functional silicone) release coatings, which do not require inert processing conditions and have less of a tendency to transfer silicone, are essentially pure silicone which require additional time or heat after irradiation to completely cure. However, these cured silicone films are quite fragile, due to the poor internal strength of unfilled crosslinked polydimethylsiloxane, making such coatings susceptible to abrasion and rub-off. Furthermore, although modification of release by incorporation of reactive diluents does increase the peel adhesion of the tape or label to the coating, it has only been demonstrated to be effective for solvent cast adhesives and, in practice, it has proven difficult to reproducibly achieve targeted modified release values using this technique. In addition, none of the prior art radiation curable formulations, except for the free radically curable compositions of U.S. Patent Application Ser. No. 08/304,424, are able to be applied using the elctrospray process, which is described in U.S. Pat. No. 4,748,043 (Seaver et al.) a method which is especially useful for the solventless application of thin films to irregular substrates.

Thus, a need exists for a rapidly curing silicone coating which can be rapidly and completely cured in air and which has easy release from most pressure sensitive adhesives, and with excellent internal strength and abrasion resistance.

A further need exists for a release coating which can be readily formulated to provide a full range of release levels reproducibly and reliably, even for pressure sensitive adhesives which are not solvent coated directly onto the silicone release coating.

Furthermore, a need exists for release coating compositions of sufficiently low viscosity and suitable conductivity to be applied via electrospray coating methods.

We have found such a release coating composition, release coating, and method of making said release coating.

SUMMARY OF THE INVENTION

We have discovered radiation cured silicone release coatings having unique morphological and structural features that provide superior qualities which are prepared from novel compositions that comprise solutions of relatively low levels of a polydiorganosiloxane substituted with small amounts of reactive functional groups dissolved in a co-reactive monomer or mixture of monomers and containing a photoactive catalyst. These coatings can be prepared to exhibit a wide spectrum of release levels from premium to tight (about 0.5–2.2 N/dm to about 3.3–16.4 N/dm, respectively), in a reliably controlled manner through simple variations in one or more of the following: reactive silicone content in the formulation; the chemical nature of the reactive diluents employed; and the coating and curing conditions.

In addition to this capability to adjust the release level of the cured coating to precisely whatever is required for any particular adhesive or application, such radiation curable coatings offer many other important advantages over what has previously been described in the prior art. Through the use of these release coating compositions, which are low in silicone content (less than about 50% by weight), problems relating to the loss of adhesion due to the transfer of unreacted silicone to an adhesive in contact with it are greatly diminished. Also, since the compositions are predominantly non-silicone reactive materials, the cured coatings exhibit exceptionally high internal strength and resistance to abrasion and rub-off, a strength similar to what is usually associated with the performance of toughened resins. Finally, variation of amounts and chemical nature of reactive diluents allows for adjustment of viscosity and conductivity of the liquid coating formulation for easy optimization of the parameters required for application by the desired coating processes, such as electrospray or offset gravure.

The present invention provides radiation curable release coating compositions comprising:

(a) about 1 to about 50 percent by weight of a cationically reactive polydiorganosiloxane liquid rubber having the following formula:

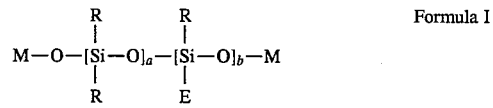

wherein

R are monovalent moieties which can be the same or different selected from the group consisting of alkyl, substituted alkyl, aryl, and substituted aryl wherein at least about 50% of the total number of silicon atoms, preferably at least about 70%, have two methyl groups bonded thereto;

E is an organic monovalent functional group comprising from about 1 to about 20 carbon atoms having at least one cationically co-reactive functional group;

a and b both represent integers, wherein the sum of a plus b is an integer of about 10 to about 1200;

b has a value ranging from about 0 to about 0.2a;

a is an integer of about 10 to about 1000; and

M is a silyl group which must contain at least one cationically co-reactive functional group when b=0 and may contain at least one cationically co-reactive group when b is greater than 0;

(b) about 50 to about 99 percent by weight of at least one cationically co-reactive monomer copolymerizable with said cationically co-reactive functional group of said polydiorganosiloxane liquid rubber;

wherein the percentages of (a) and (b) are based on the total weight of (a) plus (b); and (c) about 0.5 to about 4 parts by weight of a photoactive radiation activatable cationically reactive catalyst based on 100 parts by weight total of (a) plus (b).

Preferably, the composition of the invention consists essentially of (a) (b) and (c).

M can be further defined as a silyl group $R^1_c E_d Si$—, wherein the sum of c plus d is equal to 3, and further wherein when b=0, d must be equal to or greater than 1 and wherein $R^1$ are monovalent moieties which can be the same or different including but not limited to those selected from the group consisting of alkyl, substituted alkyl, aryl, substituted aryl, hydroxy and alkoxy.

Thus, the composition and cured release coatings of the present invention offer a wide latitude of formulation possibilities which will allow the design of optimum release coatings for many performance specifications or manufacturing requirements. For example, pure reactive silicones or mixtures with small amounts of co-reactive diluents cannot be applied to substrates using the electrospray process because the viscosity of such neat liquids is too high. Compositions of the present invention, however, having less than 30–40% by weight reactive silicone diluted with low viscosity reactive monomers provide electrosprayable solutions having viscosities of 20 milliPascals/second or less. While electrospray coating methods have several advantages, the coatings of the present invention may also be effectively applied using other coating techniques, such as offset gravure or roll coating methods.

DETAILED DESCRIPTION OF THE INVENTION

Cationically Co-Reactive Silicones

Compositions useful in the release coatings of the present invention are those of Formula I wherein at least about 1 to about 20 mole-% of the silicon atoms on the polysiloxane have pendant and/or terminal organic groups having substituents (i.e., functional groups) that are co-reactive with the reactive monomer component (b). Suitable substituents include, but are not limited to those selected from the group consisting of olefins, epoxy, mercapto, vinyl ether, and the like. The group E typically comprises 1 to 10 carbon atoms. The group E typically has 1 to 3 functional groups. The preparation of such compounds is usually accomplished by a number of procedures known in the patent literature; for example, the well known platinum catalyzed hydrosilation reaction between pendant or terminal Si-H functional groups on a polysiloxane compound and ethylenically unsaturated compounds, such as 2-allylphenol, 1-methyl-4-isopropenyl-cyclohexene oxide, 2,6-dimethyl-2,3-epoxy-7-octene, 1,4-dimethyl-4-vinylcyclohexene oxide and vinylcyclohexene monoxide. These materials and the methods for their preparation are described in U.S. Pat. No. 4,279,717 (Eckberg), incorporated herein by reference.

The mercaptofunctional polysiloxane compounds useful in the release compositions of the present invention can be prepared from any known method including, for example, (1) cohydrolysis-condensation of a mixture consisting of an organoalkoxysilane having one or more mercapto-substituted hydrocarbon groups and an alkoxysilane possessing no mercapto groups (U.S. Pat. No. 4,283,393, incorporated by reference herein), (2) reaction of an organoalkoxysilane having one or more mercapto-substituted hydrocarbon groups with a cyclic organopolysiloxane or with a silanol terminated diorganopolysiloxane possessing no mercapto groups (U.S. Pat. No. 4,046,795, incorporated by reference herein), (3) an equilibration reaction of a cyclic or linear chain organopolysiloxane having one or more mercapto-substituted hydrocarbon groups with a cyclic or linear chain organopolysiloxane having no mercapto groups (U.S. Pat. No. 4,046,795, incorporated by reference herein), (4) reaction of an organopolysiloxane having one or more nucleophilic groups such as aminoalkyl with an electrophilic reagent such as 3-mercaptopropionic acid, in order to yield a mercapto-derivatized organopolysiloxane (U.S. Pat. No. 4,783,430, incorporated by reference herein), and (5) reaction of an organopolysiloxane having one or more electrophilic groups such as haloalkyl with a nucleophilic reagent such as an alkali metal sulfide to yield a mercapto-derivatized organopolysiloxane (U.S. Pat. No. 4,558,147, incorporated by reference herein).

Silicones in which the reactive groups are epoxycyclohexylethyl are commercially available as epoxysilicone fluid UV9300 from the General Electric Company; the analogous silicone having pendant 3-mercaptopropyl groups is also available from Shin-Etsu Co as KF-2001.

In the reactive silicone component (a) of the release coating composition, the sum of a plus b must represent an integer of about 10 to about 1,200 in order to provide a functional polysiloxane that yields a release coating having the required release force. If the sum of a plus b is much less than about 10, the adhesive properties of a release coating prepared therefrom are diminished due to an insufficient number of dimethylsiloxy groups in the polysiloxane chain. If the sum of a plus b is greater than about 1200, the viscosity of the reactive silicone becomes too high for convenient processing by most conventional methods. Preferably, the sum of a plus b is an integer of about 70 to about 200, most preferably about 100 to about 150, a range that balances these release and processability concerns.

The value of b is about 0 to about 0.2a, preferably from about 0.05a to about 0.12a. Among other factors, the release properties of the release coating of the invention are dependent on the number of dimethylsiloxane segments in the polymer backbone of the polymer of Formula I. Thus, the number of pendant and/or terminal reactive functional groups is restricted to less than about 0.2 of the sum of a plus b to ensure an adequate ratio of dimethylsiloxane repeating units in the functional polysiloxanes of Formula I. To provide sufficiently fast and complete cure, preferably about 2 or more mole percent of the co-reactive functional groups must be present on the silicone fluid of Formula I.

The release coating composition of the invention comprises a solution of about 1 to about 50 percent by weight of the polydiorgano siloxane of Formula I, preferably about 5 to about 35 percent by weight dissolved in about 65 to about 95 percent by weight co-reactive monomer or mixture of monomers. The exact composition is dependent on such factors as the requirements of the coating process, the release requirements of the pressure sensitive adhesive employed, and other associated elements encountered in each particular application.

Reactive Diluents

The reactive diluents (i.e., reactive monomers) useful in the present invention are those which undergo cationic co-polymerization with the epoxy functional or other reactive functional silicone fluids described above, and having a sufficiently high boiling point above about 100° C., preferably above about 150° C., so as not to evaporate from the substrate before curing. Such monomers include, but are not limited to those selected from the group consisting of tri-alkyl and tetra-alkyl substituted olefins and cyclic olefins, such as limonene, pinene, and camphene; styrene and substituted styrenes, such as vinyl toluene, t-butyl styrene, vinyl anisole, and divinyl benzene; other phenyl substituted olefins, such as, alpha-methylstyrene, anethole, propenyl phenol, and diisopropenylbenzene; vinyl ethers, such as octadecyl vinyl ether, butanediol divinyl ether, and cyclohexane dimethanol divinyl ether; vinyl esters such as vinyl 2-ethylhexanoate and divinyl adipate; and epoxides such as 1-epoxy dodecane, styrene oxide, vinyl cyclohexene dioxide, butanediol diglycidyl ether, limonene oxide, and limonene dioxide; and mixtures thereof. The reactivity, and thus the rate of cure, of these various cationically polymerizable monomers is roughly in the following order: vinyl ether>vinyl ester>>phenyl substituted olefins~styrenes>olefins>>epoxides. In order to increase the rate of cure of compositions containing epoxides, higher reactivity monomers may be blended with the epoxides.

Preferred reactive diluents for cationically polymerized compositions include, but are not limited to those selected from the group consisting of limonene, beta-pinene, 1,4-cyclohexanedimethanol divinyl ether, diisopropenyl benzene, and mixtures thereof, due to their ready availability, low viscosity, extremely rapid and complete cure to tough coatings, and their total compatibility with the cationically co-reactive silicone component of these release coatings.

Catalyst

Sufficient photoactive catalyst is used (about 0.5 to about 4 parts, preferably about 1 to about 3 parts based on 100 parts by weight of polymer of formula I and co-reactive monomers) such that when coated on a substrate and exposed to sufficient radiation, the compositions of the invention rapidly cure to tough, coatings of tailorable and predictable release levels. The photoactive catalyst useful in the cationic cure of the cationically co-reactive functional silicone fluids and reactive diluents of the present invention include onium salts which are compatible with and stable in the polymerization mixture. Examples of useful onium salts include but are not limited to those selected from the group consisting of sulfonium salts, iodonium salts, and mixtures thereof. Particularly useful are the para-n-alkyl substituted diphenyliodonium salts described in U.S. Pat. No. 4,279,717 (Eckberg et al.), incorporated herein by reference. These iodonium salts modified with nonpolar n-alkyl substituents, such as bis(dodecyl-phenyl)iodonium hexafluoroantimonate, enhance the non-polar character of these salts and improve their miscibility in silicone liquids. Such catalysts are available commercially at 50% by weight solids from the General Electric Company under the tradename UV9310C. Due to the reduced polysiloxane content of the release coatings of the present invention, especially when compared to the 100% reactive silicone release formulations typically used or those containing minor amounts of reactive diluents reported in the literature, other onium catalysts can also be used in the cationically polymerizable release coatings of the present invention. Triaryl sulfonium and other dialkyl iodonium salts, such as those described in U.S. Pat. Nos. 4,231,511 (Smith et al.); 4,256,828 (Smith); 4,101,513 (Fox); 4,049,861 (Nozari); and 4,058,400 (Crivello), all incorporated by reference herein, are soluble in many of these low silicone, diluent rich compositions.

General Preparation and Processing

These reactive silicone/reactive monomer/catalyst compositions may be applied to substrates by most conventional coating techniques. For example, a knife blade or Mayer rod is useful for casting dilute (5–10% solids) solutions on flat surfaces, with the solvent allowed to evaporate before curing. Useful solvents include volatile organic solvents, preferably with a boiling point below about 100° C. in which all components of the invention are miscible. Examples of such solvents include but are not limited to those selected from the group consisting of isopropyl alcohol, hydrocarbons, chlorinated hydrocarbons, ethers, and mixtures thereof. The coatings of the invention also may be coated directly without solvent using roll methods such as offset gravure, or by electrospray processes. This latter option is especially useful when coating irregular surfaces.

The electrospray coating process (ES) is a non-contacting, atmospheric pressure, spray process designed to apply thin (0.04 to 0.4 micrometers ($\mu$m)) coatings at production line speeds with little or no solvent and with no over spray. This coating process consists of a series of capillary needles and is described in U.S. Pat. No. 4,748,043 (Seaver et al.), incorporated herein by reference. A recent extension of this process is the needleless Slot & Wire Electrospray Coating Process (S&W) which is described in copending, concurrently filed U.S. Pat. No. 5,326,598, titled Electrospray Coating Apparatus and Process. The process is also a non-contacting, atmospheric pressure, spray process and is designed to apply slightly thicker (0.1 to 10 $\mu$m) coatings at production line speeds with little or no solvent and with no overspray.

When the composition is applied without a volatile organic solvent by either a roll method or the electrospray method, heat, air velocity, and/or time appear to assist the formation of the silicone concentration gradient that is observed after the coating is exposed to radiation and cured.

The coated substrate or film is then exposed to sufficient radiation such as visible radiation and/or ultraviolet radiation and/or electron beam, and/or thermal devices providing a hard, completely cured polysiloxane composite release coating almost instantaneously. The selection of the radiation source depends on specific process requirements. If ultraviolet (UV) light from a medium pressure mercury lamp is used a dose of at least 150 Joules/m$^2$) appears to be needed. In contrast to free radically polymerizable release coatings, the composites of this invention are curable in air (i.e., in the presence of oxygen).

Release Coatings

The cured compositions are intended to provide a coating of desired release level to the surface of the films or substrates to which they are applied. For this purpose, a thin coating has a number of economic and performance advantages. Accordingly, they function best as ultra-thin coatings, preferably in a thickness of from about 0.1 to about 2.0 microns, most preferably in a thickness of from about 0.2 to about 0.8 microns. Although the uncured compositions are completely miscible low viscosity liquids, upon curing, the components separate into at least two immiscible polymeric phases. These coatings have either predominantly, or at least significantly, a higher concentration of polysiloxane near the surface, tapering to essentially the same, predominantly non-silicone, polymerized composition of the initial mixture throughout the remainder of the coating. It is believed that in this majority of the coating, the minor component is essentially a crosslinked polysiloxane dispersed in a much more rigid matrix of the major component; a glassy and/or crystalline and/or crosslinked resin. It is this rigid matrix provided by this major component which gives the exceptional strength and abrasion resistance of the cured coatings, as well as preventing the migration of the highly flexible polysiloxane upper layer away from the surface of the predominantly non-silicone coating.

This structure is important because the level of release of the cured coatings is determined in large part by the composition and morphology of only the top approximately 0.01 micron of the coating. In this near surface region, easy release is exhibited when silicone content is high. Inversely, modified release is obtained when the silicone content is lower.

The composition of this top approximately 0.01 micron of the cured coatings, and especially the top from about 0.0025 to 0.005 micron, is easily and reliably controlled by manipulation of a number of formulation and processing parameters. For premium release the top 0,005 micron is preferably predominently silicone. A mixture of reactive monomers containing less than 50% co-reactive silicone will tend to provide easier release of the cured coating if the amount of silicone is increased; the elapsed time between coating and exposure to sufficient irradiation is lengthened; the web speed is decreased; the substrate is heated prior to irradiation; the velocity of the air passing over the coating is increased; and/or, the formulation is coated from solvent. If heating is utilized, the temperature can range from above about room temperature (22° C.) to a temperature less than the boiling point of the composition or constituents thereof; or temperatures which can cause the substrate to decompose. Inversely, release can be modified to tighter levels by reducing the amount of silicone in the mixture; increasing the web speed; decreasing the air velocity over the coating; not heating the substrate prior to irradiation; and/or, decreasing the elapsed time between coating and irradiation.

Coating Substrates

The release coating composition of this invention can be used as a coating on a substrate, which can be a sheet, a fiber, or a shaped object as long as the substrate does not contain sufficient basic groups which can deactivate the catalyst. However, the preferred substrates are those used for pressure-sensitive adhesive products. The composition can be applied to at least one major surface of suitable flexible or inflexible backing materials and then cured. Useful flexible backing materials include plastic films such as poly(propylene), poly(ethylene), poly(vinyl chloride), poly(tetrafluoroethylene), polyester [e.g., poly(ethylene terephthalate)], polyimide film such as duPont's Kapton™, cellulose acetate, and ethyl cellulose, although any surface requiring release toward adhesives can be used. Backings can also be constructions with irregular surfaces such as woven fabric, nonwoven fabric, paper, or rough surfaces. Backings can thus also be of woven fabric formed of threads of synthetic or natural materials such as cotton, nylon, rayon, glass, or ceramic material, or they can be of nonwoven fabric such as air-laid webs of natural or synthetic fibers or blends of these, provided they are not too porous. Paper itself is usually not suitable, due to its high porosity, but plastic coated or impregnated paper is useful. Rough surfaces include embossed or patterned surfaces or particle impregnated resins such as abrasive particle covered (epoxy) resin and glass bead covered (urethane or vinyl) resins provided that the surfaces, resins, or particles are not basic (neutral and/or acidic) in nature. In addition, suitable backings can be formed of metal, metallized polymeric film, or ceramic sheet material. Primers can be utilized if they are also not basic in nature, but they are not always necessary. Basic substrates or primers tend to deactivate the acid-based catalyst used in the present invention, leading to unacceptably slow and incomplete coating cure.

EXAMPLES

All parts, percentages, ratios, etc. in the examples and the rest of the specification are by weight unless otherwise specified.

Aged Release Value

This test measures the effectiveness of the silicone release composition after a period of heat aging. The aged release value is a quantitative measure of the force required to remove a flexible adhesive tape from a substrate coated with the test composition at a specific angle and rate of removal. In the following examples this force is expressed in Newtons per decimeter (N/dm) from the following representative examples of flexible adhesive tapes:

Tape A—tackified natural rubber coated on a 1.27 cm wide resin impregnated crepe paper backing; and Tape B—acrylate pressure-sensitive adhesive coated on 1.91 cm wide cellulose acetate backing.

Aged release testing was conducted as follows: A 1.27 cm by 15.24 cm strip of Tape A or 1.9 cm by 15.24 cm strip of Tape B pressure-sensitive adhesive (PSA) coated test tape was rolled down with a 1.82 kg rubber roller onto a 2.54 cm by 20.32 cm strip of release coated substrate prepared according to the following examples and allowed to dwell in intimate contact for three days at 65° C. These laminates were then aged for at least 4 hours at 22.2° C. and 50% relative humidity and then adhered tape side up to the stage of an Instrumentors, Inc. slip/peel tester (model 3M90) with double coated tape. The force required to remove the test tape at 180° and 228.6 cm/min was measured. The results of these tests are reported below.

Aged readhesions were also measured by adhering the freshly peeled tape to a clean glass plate and measuring the peel adhesion in normal fashion using the same Instrumentors slip/peel tester indicated above, again peeling at 228.6 cm/min and at a 180° peel angle after allowing the test tape to dwell on the glass plate for at least 30 seconds. These measurements were taken to determine whether a drop in the adhesion value occurred due to undesirable contamination of the adhesive surface by transfer of unincorporated silicone in the release coating. Readhesions are reported as a percentage of the force required to remove the aged sample from a clean glass plate versus the force required to remove a control tape sample from a clean glass plate which has not been adhered to the release coating.

Abbreviations

AN anethole (propenyl anisole)
BP beta-pinene
C camphene

CHVE 1,4-cyclohexanedimethanol divinyl ether
DCD dicyclopentadiene
DIPB diisopropenyl benzene
DVA divinyl adipate, available from Union Carbide Co.
DVB divinylbenzene, a mixture of 55% divinylbenzene and 45% ethyl styrene from Dow Chemical Co.
ES epoxysilicone
hr. hours
KF2001 mercaptopropyl-functional polysiloxane of average molecular weight of approximately 8000 having approximately 4 pendant mercapto propyl groups per chain, commercially available from Shin Etsu Co.
LM limonene
LO limonene oxide
MeSt alpha-methylstyrene
min. minutes
MYR myrcene
PET polyethylene terephthalate
PMS para-methylstyrene
Readh. readhesion
RH relative humidity
RR roll ratio
TBS tert-butylstyrene
Temp. temperature
UV9300 epoxysilicone fluid of average molecular weight 9000 (epoxy equivalent weight 900), commercially available from the General Electric Co.
UV9310C diaryl iodonium catalyst commercially available at 50% by weight solids from General Electric Co.
V1,13 1,13-tetradecene dioxide
V12 1-dodecane oxide, available as Vikolox V-12 from Atochem North America
Wt. weight
4206 ERL-4206, vinyl cyclohexene dioxide commercially available from Union Carbide Co.
4221 ERL-4221, 3,4-epoxyxyclohexylmethyl-3,4-epoxycyclohexane-carboxylate commercially available from Union Carbide Co.

EXAMPLES 1–28

Solvent Cast Formulations

In the following examples, the GE epoxysilicone UV9300, cationically copolymerizable monomers, and 1 to 2 parts catalyst UV9310C (per 100 parts of UV9300 plus monomers) were dissolved in isopropyl alcohol solution at 5% solids, and coated on unprimed polyester film using a #3 Mayer rod. The solvent was allowed to evaporate at room temperature, and the film run under a PPG Industries, Inc. UV processor at 15.25 m/min. at high intensity (500 $J/m^2$ at 254 nm and 1250 $J/m^2$ at 365 nm). In almost all cases, the coating was smear-free immediately out of the processor; the only exceptions appeared to be 1-dodecene oxide (V12) and divinylbenzene (DVB), which became smear-free in 30 to 40 seconds. Tape samples were tested for release and readhesion after aging at 65° C. for 3 days. The percentage by weight epoxysilicone and other monomers for these compositions are shown for each example, along with aged release and readhesion values, and are listed below in Table I.

TABLE I

| | | | Tape A | | Tape B | |
|---|---|---|---|---|---|---|
| Ex. | Composition | Wt. % | Aged Release (N/dm) | Aged Readh. (%) | Aged Release (N/dm) | Aged Readh. (%) |
| 1 | UV9300/DVA | 25/75 | 5.5 | 93 | 1.6 | 100 |
| 2 | UV9300/DIPB | 2/98 | | | 12.3 | |
| 3 | UV9300/DIPB | 4/96 | | | 2.0 | |
| 4 | UV9300/AN | 25/75 | 2.4 | 96 | 0.8 | 89 |
| 5 | UV9300/CHVE | 2/98 | | | 16.4 | 103 |
| 6 | UV9300/CHVE | 5/95 | | | 2.8 | 114 |
| 7 | UV9300/CHVE | 20/80 | 8.5 | 103 | 2.3 | 120 |
| 8 | UV9300/CHVE | 100/0 | | | 1.0 | 106 |
| 9 | UV9300/DVB | 60/40 | 1.3 | 89 | | |
| 10 | UV9300/DVB | 40/60 | 1.3 | 94 | | |
| 11 | UV9300/DVB | 5/95 | 7.2 | 93 | 1.5 | 94 |
| 12 | UV9300/DVB | 1/99 | | | 4.3 | 118 |
| 13 | UV9300/V12 | 40/60 | 2.4 | 130 | 0.7 | 101 |
| 14 | UV9300/V12 | 20/80 | 5.0 | 126 | 1.1 | 100 |
| 15 | UV9300/DCD | 25/75 | 2.2 | 109 | 1.3 | 91 |
| 16 | UV9300/BP | 40/60 | 5.0 | 108 | 1.1 | 78 |
| 17 | UV9300/BP | 20/80 | 5.9 | 107 | 0.8 | 86 |
| 18 | UV9300/BP | 5/95 | 14.9 | 101 | 6.1 | 94 |
| 19 | UV9300/TBS | 20/80 | 5.0 | 109 | 0.7 | 80 |
| 20 | UV9300/TBS | 5/95 | 20.8 | 98 | 7.7 | 89 |
| 21 | UV9300/MeST | 20/80 | 6.6 | 105 | 1.6 | 87 |
| 22 | UV9300/MYR | 20/80 | 15.8 | 100 | 3.9 | 97 |
| 23 | UV9300/LM | 5/95 | 20.8 | 97 | 3.8 | 84 |
| 24 | UV9300/LM | 40/60 | 3.1 | 110 | 1.3 | 82 |
| 25 | UV9300/PMS | 5/95 | 19.9 | 98 | 6.2 | 89 |
| 26 | UV9300/V1,13/CHVE | 20/20/60 | 8.3 | 108 | | |
| 27 | UV9300/V12/4206 | 20/60/20 | 10.3 | 118 | 1.5 | 130 |
| 28 | UV9300/V12/4221 | 10/80/10 | | | 1.5 | 94 |

EXAMPLE 29

Preparation of a Vinyl Ether Functional Silicone

A solution was prepared containing 18.2 g of KF-2001, 7.1 g 1,4-cyclohexanedimethanol divinyl ether (CHVE), 13.0 g ethyl acetate, and 0.1 g azobis isobutyronitrile initiator. Nitrogen gas was bubbled through the solution for 5 min, and then the reaction was heated to 55° C. for 48 hr. After cooling to ambient temperature, gas chromatographic analysis indicated that approximately 3.5 g of the CHVE had been consumed, converting the mercaptopropyl functional silicone into a vinyl ether functional silicone through the free radical addition of the mercapto groups to one of the vinyl groups of the excess CHVE. This mixture was used as obtained for the preparation of a silicone release coating as described in the following Example 30.

EXAMPLE 30

To a solution 1.67 g of the vinyl ether functional silicone (VEFS) product from Example 29 and 1.0 g of cyclohexane dimethanol divinyl ether (CHVE), in enough isopropyl alcohol to give a total of 20 g, was added 2 parts (based on 100 parts by weight of reactants—silicone plus CHVE) of the photoactive catalyst UV9310c. The solution was coated and irradiated as in the solvent coated Examples 1–28. Tape samples were tested for release and readhesion after aging at 65° C. for 3 days. The percentage by weight epoxysilicone and other monomers for this composition, along with aged release and readhesion values, is listed below in Table II.

TABLE II

| | | | Tape A | |
|---|---|---|---|---|
| Ex. | Composition | Wt. % | Aged Release (N/dm) | Aged Readh. (%) |
| 30 | VEFS/CHVE | 38/62 | 19.6 | 90 |

EXAMPLES 31 AND 32

Two formulations were prepared, each containing 25 weight percent of the mercapto functional silicone, KF-2001. In the first case (Example 31), a solution was prepared from 0.25 g KF-2001, 0.75 g CHVE, 0.02 g UV9301C catalyst; the second (Example 32), had 0.25 g KF-2001, 0.25 g CHVE, 0.50 g alpha-methylstyrene, 0.02 g UV9310C; and each diluted with 19 g isopropyl alcohol. These solutions were coated on unprimed polyester film using a No. 3 Mayer rod, the solvent evaporated and the coating was irradiated as in Example 30. Tape samples were tested for release and readhesion after aging at 65° C. for 3 days. The percentage by weight epoxysilicone and other monomers for this composition, along with aged release and readhesion values, is listed below in Table III.

TABLE III

| | | | Tape A | | Tape B | |
|---|---|---|---|---|---|---|
| Ex. | Composition | Wt. % | Aged Release (N/dm) | Aged Readh. (%) | Aged Release (N/dm) | Aged Readh. (%) |
| 31 | KF2001/CHVE | 25/75 | 2 | 89 | 4.1 | 111 |
| 32 | KF2001/CHVE/MeST | 25/25/50 | 1.3 | 84 | 0.7 | 114 |

EXAMPLE 33

This example describes how two solventless epoxysilicone containing compositions were used to make near premium release and modified release silicone coatings with the Slot & Wire Electrospray Coating Process (S&W) and a heat source consisting of an air impingement oven. S&W is described in copending concurrently filed U.S. Pat. No. 5,326,598, Electrospray Coating Apparatus and Process, Seaver et al., incorporated by reference herein. The first solution was prepared by mixing the following commercially available liquids: 40 percent by weight of an epoxysilicone (UV9300), 20 percent by weight of 1,4-cyclohexanedimethanol divinyl ether (CHVE), 15 percent by weight of limonene oxide (LO), and 25 percent by weight of limonene (LM). To this was added 3 parts by weight of the total solution of an iodonium salt catalyst (UV9310C). The mixture was designated as 40/20/15/25+3. The second solution was prepared by mixing the above liquids in the following proportions: 25/20/15/40+3. The first solution's physical properties pertinent to S&W were a conductivity of 11 micro Siemans per meter (µS/m), a viscosity of 19 milliPascal-seconds (mPa-s), a dielectric constant of 7.5 and a surface tension of 24 milliNewtons per meter (mN/m). The second solution's physical properties pertinent to electrospray were a conductivity of 11 µS/m, a viscosity of 9 mPa-s, a dielectric constant of 7.6 and a surface tension of 24 mN/m.

A Slot and Wire electrospray coating system was used which consisted of a hollowed-out plastic block having a triangular shaped cross-section with a slot cut along the bottom edge, a wire suspended beneath the slot, and extractor rods suspended parallel to the wire in approximately the same horizontal plane. The slot had a length of 305 mm, a width of 0,610 mm and a height of 19 mm. The wire had a diameter of 2.4 mm and was positioned 2 mm beneath the slot for the more viscous solution (40/20/15/25+3) and 1 mm beneath for the second less viscous solution (25/20/15/40+3). The extractor rods each had diameters of 6.4 mm and were positioned on either side of the wire at a distance of 25 mm from the wire. The solution to be coated was introduced into the S&W coating head using a MicroPump Model 7520-35 and a magnetically coupled gear pump head available from Cole-Palmer Instrument Company as catalog numbers N-07520-35 and A-07002-27, respectively.

A high voltage of positive 25 kV was applied to the wire with a High Voltage DC Power Supply Model R60A by Hipotronics in Brewster N.Y. The extractor rods were grounded. The wire was positioned 90 mm above the film surface to be coated as it passed over the surface of a free-spinning, conductive, 610 mm diameter metal drum. This coating station allowed rolls of plastic film, paper, or metal foil to be coated. Furthermore, the previously mentioned rolls could be used as carrier webs on which other sheet samples could be placed. The metal drum was held at ground potential.

A 305 mm wide roll of 36 micrometers (µm) thick PET film was fed through the coating station. The film surface was charged to a potential sufficient to pin the film to the metal drum and film sheet samples to the carrier web (approximately negative 1.5 kV). The pump flow rate was held constant at 5.5 ml/min, out of 305 mm long slot. The solution wetted 305 mm of the wire beneath the slot. Web speeds of 9.1, 27.4 and 45.7 meters/min (m/min) were used. Estimated coating thicknesses at the different speeds were 2.0, 0.7 and 0.4 m respectively.

The coated film was then exposed to heat and ultraviolet radiation to convert the coating into a durable release surface. For the first two solutions the coated film was passed through a 2.4 meters (m) long air impingement oven with an estimated heat transfer coefficient of between 62.8 Joules per second per square meter per degree Celsius (J/(s m² °C.)) and 125.5 J/(s m² °C.). The velocity of the air currents was sufficient to float the film between air nozzles placed above and below the coated film and not permit the coated film to touch the stationary nozzles. Three air temperatures were used in the oven for each solution (35° C. 42° C. and 60° C. for the first solution and 24° C., 44° C. and 59° C. for the second). The residence times in the oven at the three speeds were 16, 5.3 and 3.2 seconds (s). The coated film was estimated to have reached the oven air temperature within 3.2 s at the lower heat transfer coefficient estimate and 1.6 s at the higher estimate. The coated film then passed under a medium pressure mercury vapor lamp and was exposed to 880, 290 and 180 J/m² of 254 nm radiation at 9.1, 27.4 and 45.7 m/min, respectively.

The cured coatings were aged and release tested as described above against tapes with either a tackified natural rubber adhesive (Tape A) or an acrylate adhesive (Tape B). No significant loss in readhesion was observed. The average release values in N/dm tape width for the different epoxy-silicone concentrations and web temperatures at the three speeds (9.1, 27.4 and 45.7 meters per min) were recorded and are listed in Table IV.

TABLE IV

| Condition | | Tape A | | | Tape B | | |
|---|---|---|---|---|---|---|---|
| Web | | Speed | | | | | |
| ES (%) | Temp (°C.) | (m/m) → 9.1 Time (sec) → 16 | 27.4 5.3 | 45.7 3.2 | 9.1 16 | 27.4 5.3 | 45.7 3.2 |
| 40 | 35 | 1.6 | 3.1 | 5.8 | 0.8 | 1.7 | 5.6 |
| 40 | 42 | 1.5 | 1.7 | 4.1 | 0.6 | 0.5 | 3.2 |
| 40 | 60 | 1.8 | 0.9 | 2.5 | 0.3 | 0.1 | 1.1 |
| 25 | 24 | 1.9 | 3.2 | 3.9 | 1.3 | 3.9 | 5.6 |
| 25 | 44 | 1.1 | 2.6 | 2.1 | 0.8 | 0.8 | 1.3 |
| 25 | 59 | 1.8 | 1.2 | 1.9 | 1.2 | 0.7 | 1.0 |

As the aged release data in Table IV illustrate, as time was decreased between the coating application step and the cure step, release increased. Also, as time decreased it was advantageous to use heat to obtain easy release performance with these solution compositions. If enough time is allowed, the air velocity passing over the coating was sufficient to obtain easy release performance upon cure.

EXAMPLE 34

This example describes how a solventless epoxysilicone containing composition was used to make near premium release and modified release silicone coatings with S&W and a heat source consisting of hot air blowing counter-currently through a tunnel. The solution was prepared by mixing the liquids described in Example 33 in the following proportions: UV9300/CHVE/LO/LM+catalyst 35/20/15/30+3, respectively. The solution's physical properties pertinent to electrospray were a conductivity of 12 µS/m, a viscosity of 15 mPa-s, a dielectric constant of 7.6 and a surface tension of 24 mN/m.

Sheets of 305 mm by 914 mm by 51 µm PET film were placed on a 330 mm wide roll of 61 µm thick PET carrier film and fed through the coating station. The film surface was charged to a potential sufficient to pin the film to the metal drum (approximately negative 1.5 kV). The pump flow rate was held constant at 5.5 ml/min out of a 305 mm long slot. The solution wetted 305 mm of the wire which was positioned 2 mm beneath the slot. Web speeds of 9.1, 15.2, 21.3 and 27.4 m/min were used. Estimated coating thicknesses at the different speeds were 2.0, 1.2, 0.8 and 0.7 µm, respectively.

The coated film was then exposed to heat and ultraviolet radiation to convert the coating into a durable release surface. The coated film was passed through a tunnel 25 mm by 356 mm by 1.83 m. For half of the samples, a hot air blower (Model 6056 by Leister in Switzerland), with an exit air temperature at the nozzle of 187° C., fed air into the tunnel countercurrent to the web movement. The coated film was suspended between the ceiling and the floor of the tunnel by tension. The air velocity was insufficient to float the film in this example even if the air had passed over the bottom and top of the coated film. The air temperature exiting the tunnel was approximately 100° C. and the web temperature exiting the tunnel was estimated to be approximately 50° C. based on infrared measurement of the polyester film at similar conditions using a device similar to a Mikron M90 Series Portable IR Thermometer by Mikron Instrument Company Inc. Wyckoff, N.J. The coated film was then passed under a medium pressure mercury vapor lamp and exposed to 400 J/m² of 254 nm radiation.

The cured coatings were heat aged and release tested as in Example 33 for 3 days against tapes with either a tackified natural rubber (Tape A) or an acrylate adhesive (Tape B). No significant loss in readhesion was observed. The release values in N/dm tape width for the different web temperatures at the four speeds (9.1, 15.2, 21.3 and 27.4 m/min) were recorded and listed below in Table V.

TABLE V

| Web Speed (m/min) | Time (sec) | Coating Thickness (µm) | Tape A | | Tape B | |
|---|---|---|---|---|---|---|
| | | | No Heat | Heat | No Heat | Heat |
| 9.1 | 12.0 | 2.0 | 9.1 | 1.6 | 11.2 | 1.0 |
| 15.2 | 7.2 | 1.2 | 9.3 | 2.6 | 15.9 | 1.7 |
| 21.3 | 5.1 | 0.8 | 10.2 | 3.3 | 20.7 | 2.9 |
| 27.4 | 4.0 | 0.7 | 10.9 | 4.8 | 28.7 | 10.5 |

A wide range of release values were obtained as the exposure to heat before the curing step and/or time between coating step and curing step were varied. Since the air velocity over the coated film was much less than that in Ex. 33, the release values without heat were higher at the same web speeds.

WITH OFFSET GRAVURE COATING PROCESS

EXAMPLE 35

This example describes how epoxysilicone containing compositions were used to make near premium release and modified release silicone coatings with the Offset Gravure Coating Process and a heat source comprising a hot can (i.e., heated roller). Three solutions were prepared by mixing the liquids (UV9300/CHVE/LO/LM+catalyst) as described in Example 33 in the following proportions: 25/20/0/55+3, 35/20/0/45+3 and 45/20/0/35+3. The physical properties of the solutions pertinent to offset gravure were viscosities of 10, 13 and 15 mPa-s, respectively, and surface tensions of 24 mN/m for all three solutions.

Each solution was applied to a 305 mm wide roll of 36 m thick PET film With a commercial roll coater in the direct offset gravure roll configuration. Each of the three independently driven rolls had a diameter of 203 mm. The chrome plated stainless steel gravure roll had a pyramidal pattern which resulted in a coating thickness of 4.3 µm at 100% pickout. The neoprene rubber transfer roll had a hardness of approximately 90 durometer (Shore A scale). A chrome plated stainless steel roll was used as a backup roll. The coating was assumed to have split approximately evenly as it was transferred from the gravure roll to the rubber roll and to have split approximately evenly again as it was transferred from the rubber transfer roll to a substrate that passed between the transfer roll and the steel backup roll. The rubber roll was run at the same speed as the gravure roll. The steel backup roll was run at the same speed as the PET substrate. The Roll Ratio (RR) consists of a ratio of the surface speed of the backup roll to the surface speed of the gravure roll. When both speeds were the same, the estimated coating thickness was 1.0 μm. Then the substrate moved twice as fast as the surface speed of the gravure roll, the estimated thickness was 0.5 μm.

The coated film was then heated by passing over an oil heated hot can with a diameter of 610 mm and cured. The film was in contact with 330 mm of the surface circumference of the hot can. A line speed of 37 m/min was used when the hot can was not heated. A line speed of 18 m/min was used when the hot can was heated to a surface temperature of 54° C. One heated sample was repeated at the faster line speed. The heated web temperature was measured with a Mikron M90 Series Portable IR Thermometer by Mikron Instrument Company Inc. Wyckoff, N.J. The coated film was then passed under a medium pressure mercury vapor lamp and exposed to 210 J/m$^2$ of 254 nm radiation.

The cured coatings were heat aged and release tested as in Example 33 for 3 days against tapes with either a tackified natural rubber (Tape A) or an acrylate adhesive (Tape B). No significant loss in readhesion was observed. The release values in N/dm tape width for the different epoxysilicone concentrations, web temperatures and roll ratios were recorded and listed below in Table VI.

TABLE VI

| ES (%) | RR (m/min) | Coating Thickness (μm) | Tape A @24° C. | Tape A @54° C. | Tape B @24° C. | Tape B @54° C. |
| --- | --- | --- | --- | --- | --- | --- |
| 25 | 37/37 | 1.0 | 19.2 | 4.7 | 30.6 | 10.4 |
| 25 | 18/18 | 1.0 | — | 1.9 | — | 3.6 |
| 25 | 37/18 | 0.5 | 5.9 | 2.4 | 13.9 | 5.1 |
| 25 | 18/9 | 0.5 | — | 2.1 | — | 3.2 |
| 35 | 37/37 | 1.0 | 11.4 | — | 22.0 | — |
| 35 | 18/18 | 1.0 | — | 1.7 | — | 2.4 |
| 35 | 37/18 | 0.5 | 2.8 | — | 11.4 | — |
| 35 | 18/9 | 0.5 | — | 1.9 | — | 1.4 |
| 45 | 37/37 | 1.0 | 10.5 | — | 11.3 | — |
| 45 | 18/18 | 1.0 | — | 1.9 | — | 2.3 |
| 45 | 37/18 | 0.5 | 2.4 | — | 5.0 | — |
| 45 | 18/9 | 0.5 | — | 1.8 | — | 1.2 |

As with the S&W Coating Process, a wide range of release values were obtained.

EXAMPLE 36

This example illustrates the effect of the concentration of one of the non-silicone components on the release performance of the cured coating using the Offset Gravure Coating Process. The three solutions were prepared by mixing the liquids (UV9300/CHVE/LO/LM+catalyst) as described in Example 33 in the following proportions: 45/20/20/15+3, 45/20/10/25+3 and 45/20/0/35+3.

Each of these solutions was applied to a 305 mm wide roll of 36 μm thick PET film with the same roll coater setup described in Example 35 except that the rubber roll was run at the same speed as the backup steel roll. No heat was applied to the coated film before the curing step. The line speed was constant at 37 m/min. The coated film was then passed under a medium pressure mercury vapor lamp and exposed to 220 J/m$^2$ of 254 nm radiation. Two different lamps were used such that the residence time between the coating application step and the cure step was either 9 seconds or 15 seconds.

The cured coatings were heat aged and release tested as in Example 33 for 3 days against tapes with either a tackified natural rubber adhesive (Tape A) or an acrylate adhesive (Tape B) or were room temperature aged at 22.2° C. and 50% RH for 7 days against the tape samples. No significant loss in readhesion was observed. The release values in N/dm tape width for the different limonene oxide (LO) concentrations, roll ratios (RR) and aged conditions were recorded and listed below in Table VII.

TABLE VII

| LO (%) | Time (sec) | RR (m/min) | Coating Thickness (μm) | Tape A 3 days @65° C. | Tape A 7 days @22° C. | Tape B 3 days @65° C. | Tape B 7 days @22° C. |
| --- | --- | --- | --- | --- | --- | --- | --- |
| 20 | 9 | 37/37 | 1.0 | 7.1 | 4.6 | 43.8 | 41.9 |
| 20 | 9 | 37/18 | 0.5 | 11.3 | 9.6 | 45.7 | 41.3 |
| 10 | 9 | 37/37 | 1.0 | 5.7 | 3.0 | 21.4 | 17.1 |
| 10 | 9 | 37/18 | 0.5 | 4.7 | 2.6 | 20.9 | 12.0 |
| 10 | 15 | 37/37 | 1.0 | 3.8 | 5.5 | 21.0 | 15.9 |
| 10 | 15 | 37/18 | 0.5 | 5.8 | 2.6 | 15.5 | 10.1 |

TABLE VII-continued

| LO (%) | Time (sec) | RR (m/min) | Coating Thickness (μm) | Tape A 3 days @65° C. | Tape A 7 days @22° C. | Tape B 3 days @65° C. | Tape B 7 days @22° C. |
| --- | --- | --- | --- | --- | --- | --- | --- |
| 0 | 15 | 37/37 | 1.0 | 4.2 | 3.6 | 5.0 | 2.6 |
| 0 | 15 | 37/18 | 0.5 | 3.9 | 1.8 | 6.6 | 3.4 |
| 20 | 84 | 37/18 | 0.5 | 5.5 | 1.9 | 12.1 | 4.7 |
| 10 | 96 | 37/18 | 0.5 | 5.8 | 1.8 | 14.5 | 5.6 |
| 0 | 84 | 37/18 | 0.5 | 5.0 | 1.6 | 15.9 | 6.0 |

As Table VII illustrates, limonene oxide concentration has more of an effect on the acrylate containing Tape B than the less reactive tackifier natural rubber adhesive (Tape A).

EXAMPLE 37

This example illustrates the effect of a lower concentration of photoactive catalyst and high concentrations of limonene oxide on the release performance of the cured coating using the Offset Gravure Coating Process. The two solutions were prepared by mixing the liquids described in Example 33 in the following proportions: 45/20/20/15+2 and 25/20/30/25+2.

Each solution was applied to a 305 mm wide roll of 36 μm thick PET film with the same roll coater setup described in Example 36. No heat was applied to the coated film. The line speed was 18 m/min for the samples made with the backup roll speed matching the gravure roll speed and 37 m/min for samples where the two rolls had different speeds. The coated film was then passed under a medium pressure mercury vapor lamp and exposed to 220 J/m$^2$ of 254 nm radiation.

The cured coatings were heat aged or room temperature aged and release tested as in Example 36 against tapes with either a tackified natural rubber adhesive (Tape A) or an acrylate adhesive (Tape B) except that the room temperature aging was for 5 days instead of 7 days. No significant loss in readhesion was observed. The release values in N/dm tape width for the lower initiator concentration and high limonene oxide concentration solutions at different epoxysilicone concentrations, roll ratios and aged conditions were recorded and listed below in Table VIII.

TABLE VIII

| ES (%) | RR (m/min) | Coating Thickness (μm) | Tape A 3 days @65° C. | Tape A 5 days @22° C. | Tape B 3 days @65° C. | Tape B 5 days @22° C. |
| --- | --- | --- | --- | --- | --- | --- |
| 45 | 18/18 | 1.0 | 15.7 | 12.0 | 20.6 | 21.5 |
| 45 | 37/18 | 0.5 | 15.2 | 10.1 | 14.8 | 9.5 |
| 45 | 37/9 | 0.3 | 9.3 | 10.1 | 12.4 | 5.0 |
| 25 | 18/18 | 1.0 | 21.9 | 14.4 | 49.1 | 36.9 |
| 25 | 37/18 | 0.5 | 12.8 | 12.6 | 34.3 | 29.9 |
| 25 | 37/9 | 0.3 | 18.0 | 14.9 | 43.3 | 27.3 |

The release values are higher for both adhesives than those for similar conditions in Example 36.

EXAMPLE 38

This example describes how a solventless epoxysilicone containing composition was used to make a thin, easy-release, coated surface on a rough substrate for an adhesive application with S&W and the same heat source as used in Example 34. The solution to be coated was the same as the first solution of Example 33 (40/20/15/25+3). The method of applying the solution to a substrate was also the same as described in Example 33.

A 102 mm by 7.6 m rough-surfaced strip of glass bead impregnated resin, adhesive coated on the underside and loosely adhered to 305 mm wide silicone coated paper, was placed on a 330 mm wide roll of 61 μm thick PET carrier film and fed through the coating station. The rough surface and the exposed silicone coated paper were charged to a negative potential of approximately 1.5 kV. The pump flow rate was held constant at 5.5 ml/min out of a 305 mm long slot. Solution wetted 305 mm of the wire beneath the slot. The web speed was constant at 15.2 m/min. The coating thickness was estimated at 1.2 μm.

The coated film was then exposed to heat and ultraviolet radiation to convert the coating into a durable release surface. The coated film was passed through a tunnel 25 mm high by 356 mm wide by 1.83 m long. A hot air blower (Model 6056 by Leister in Switzerland), with an exit air temperature at the nozzle of 187° C., fed air into the tunnel countercurrent to the web movement. The air temperature exiting the tunnel was approximately 100° C. and the web temperature exiting the tunnel was estimated to be approximately 50° C. based on infrared measurement of the polyester film at similar conditions using a device similar to a Mikron M90 Series Portable IR Thermometer by Mikron Instrument Company Inc in Wyckoff N.J. The coated film was then passed under a medium pressure mercury vapor lamp and exposed to 400 J/m$^2$ of 254 nm radiation.

The subsequent cured coatings exhibited satisfactory release and readhesion performance characteristics when tested against the tackified natural rubber adhesive similar to that which was on the bottom of the coated substrates.

While this invention has been described in connection with specific embodiments, it should be understood that it is capable of further modification. The claims herein are intended to cover those variations which one skilled in the art would recognize as the chemical equivalent of what has been described here.

What is claimed:

1. A radiation curable release coating composition comprising:
   (a) about 1 to about 50 percent by weight of a cationically reactive polydiorganosiloxane liquid rubber having the following formula:

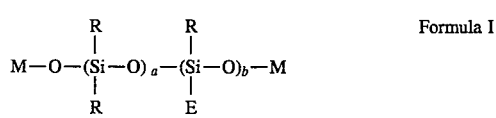

Formula I wherein

R are monovalent moieties which can be the same or different selected from the group consisting of alkyl and aryl, wherein at least about 50% of the total number of silicon atoms have two methyl groups bonded thereto;

E is an organic monovalent functional group comprising from about 1 to about 20 carbon atoms having at least one cationically co-reactive functional group;

a and b both represent integers, wherein the sum of a plus b is an integer of about 10 to about 1200;

b has a value ranging from about 0 to about 0.2a;

a is an integer of about 10 to about 1000; and

M is a silyl group which must contain at least one cationically co-reactive functional group when b=0 and may contain at least one cationically co-reactive group when b is greater than 0;

(b) about 50 to about 99 percent by weight of cationically co-reactive monomer(s) copolymerizable with said cationically co-reactive functional group of said polydiorganosiloxane liquid rubber, wherein at least one of said cationically co-reactive monomer(s) is a monomer having a higher reactivity than epoxides;

wherein the percentages of (a) and (b) are based on the total weight of (a) plus (b); and (c) about 0.5 to about 4 parts by weight of a photoactive radiation activatable cationically reactive catalyst based on the weight of (a) plus (b).

2. The release coating composition of claim 1 wherein the sum of a plus b is an integer of about 70 to about 200.

3. The release coating composition of claim 1 wherein the sum of a plus b is an integer of about 100 to about 150.

4. The release coating composition of claim 1 wherein said coating comprises about 5 to about 35 percent by weight polydiorganosiloxane liquid rubber and about 65 to about 95 percent by weight coreactive monomer.

5. The release coating composition of claim 1 wherein R are monovalent moieties which can be the same or different selected from the group consisting of alkyl and aryl, wherein at least about 70% of the total number of silicon atoms have two methyl groups bonded thereto.

6. The release coating composition of claim 1 wherein said catalyst comprises an onium salt.

7. The release coating composition of claim 1 wherein said catalyst is selected from the group consisting of sulfonium salts, iodonium salts, and mixtures thereof.

8. The release coating composition of claim 1 wherein E is an organic monovalent functional group comprising from 1 to 10 carbon atoms having at least one cationically co-reactive functional group.

9. The release coating composition of claim 1 wherein E has 1 to 3 cationically co-reactive functional groups.

10. The release coating composition of claim 1 wherein said cationically co-reactive functional group(s) of E are selected from the group consisting of olefins, epoxy groups, mercapto groups, and vinyl ether groups.

11. The composition of claim 1 wherein said cationically co-reactive functional group(s) of E are selected from the group consisting of epoxycyclohexylethyl groups and 3-mercaptopropyl groups.

12. The release coating composition of claim 1 wherein said cationically co-reactive monomer is selected from the group consisting of vinyl ethers, vinyl esters, phenyl substituted olefins, styrenes, olefins, epoxides, and mixtures thereof.

13. The release coating composition of claim 1 wherein said cationically co-reactive monomer is selected from the group consisting of limonene, pinene, camphene, vinyl toluene, t-butyl styrene, vinyl anisole, divinyl benzene, alpha-methylstyrene, anethole, propenyl phenol, diisopropenylbenzene, octadecyl vinyl ether, butanediol divinyl ether, cyclohexane dimethanol divinyl ether, vinyl 2-ethylhexanoate, divinyl adipate, 1-epoxy dodecane, styrene oxide, vinyl cyclohexene dioxide, butanediol diglycidyl ether, limonene oxide, limonene dioxide, and mixtures thereof.

14. The release coating composition of claim 1 wherein said cationically co-reactive monomer is selected from the group consisting of limonene, beta-pinene, 1,4-cyclohexanedimethanol divinyl ether, diisopropenyl benzene, and mixtures thereof.

15. The release coating of claim 1 Wherein R are monovalent moieties which can be the same or different selected from the group consisting of alkyl and aryl, wherein at least about 70% of the total number of silicon atoms have two methyl groups bonded thereto.

16. A release coating comprising: the reaction product of:

(a) about 1 to about 50 percent by weight of a cationically reactive polydiorganosiloxane liquid rubber having the following formula:

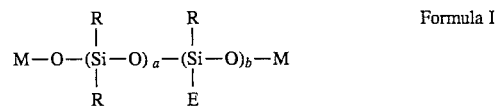

wherein

R are monovalent moieties which an be the same or different selected from the group consisting of alkyl and aryl wherein at last about 50% of the total number of silicon atoms have two methyl groups bonded thereto;

E is an organic monovalent functional group comprising from about 1 to about 20 carbon atoms having at least one cationically co-reactive functional group;

a and b both represent integers, wherein the sum of a plus b is an integer of about 10 to about 1200;

b has a value ranging from about 0 to about 0.2a;

a is an integer of about 10 to about 1000; and

M is a silyl group which must contain at least one cationically co-reactive functional group when b=0 and may contain at least one cationically co-reactive group when b is greater than 0;

(b) about 50 to about 99 percent by weight of cationically co-reactive monomer(s) copolymerizable with said cationically co-reactive functional group of said polydiorganosiloxane liquid rubber, wherein at least one of said cationically co-reactive monomer(s) is a monomer having a higher reactivity than epoxides;

wherein the percentages of (a) and (b) are based on the total weight of (a) plus (b); and (c) about 0.5 to about 4 parts by weight of a photoactive radiation activatable cationically reactive catalyst based on the weight of (a) plus (b).

17. The release coating of claim 16 wherein the sum of a plus b is an integer of about 70 to about 200.

18. The release coating of claim 16 wherein the sum of a plus b is an integer of about 100 to about 150.

19. The release coating of claim 16 wherein said coating comprises about 5 to about 35 percent by weight polydiorganosiloxane liquid rubber and about 65 to about 95 percent by weight coreactive monomer.

20. The release coating of claim 16 wherein said catalyst comprises an onium salt.

21. The release coating of claim 16 wherein said catalyst is selected from the group consisting of sulfonium salts, iodonium salts, and mixtures thereof.

22. The release coating of claim 16 wherein E is an organic monovalent functional group comprising from 1 to 10 carbon atoms having at least one cationically co-reactive functional group.

23. The release coating of claim 16 wherein E has 1 to 3 cationically co-reactive functional groups.

24. The release coating of claim 16 wherein said cationically co-reactive functional group(s) of E are selected from the group consisting of olefins, epoxy groups, mercapto groups, and vinyl ether groups.

25. The composition of claim 16 wherein said cationically co-reactive functional group(s) of E are selected from the group consisting of epoxycyclohexylethyl groups and 3-mercaptopropyl groups.

26. The release coating of claim 16 wherein said cationically co-reactive monomer is selected from the group consisting of vinyl ethers, vinyl esters, phenyl substituted olefins, styrenes, olefins, epoxides, and mixtures thereof.

27. The release coating of claim 16 wherein said cationically co-reactive monomer is selected from the group consisting of limonene, pinene, camphene, vinyl toluene, t-butyl styrene, vinyl anisole, divinyl benzene, alpha-methylstyrene, anethole, propenyl phenol, diisopropenylbenzene, octadecyl vinyl ether, butanediol divinyl ether, cyclohexane dimethanol divinyl ether, vinyl 2-ethylhexanoate, divinyl adipate, 1-epoxy dodecane, styrene oxide, vinyl cyclohexene dioxide, butanediol diglycidyl ether, limonene oxide, limonene dioxide, and mixtures thereof.

28. The release coating of claim 16 wherein said cationically co-reactive monomer is selected from the group consisting of limonene, beta-pinene, 1,4-cyclohexanedimethanol divinyl ether, diisopropenyl benzene, and mixtures thereof.

29. The release coating of claim 16 wherein the top 0.005 micron of the coating is predominantly silicone.

30. The release coating of claim 16 wherein the top 0.005 micron of the coating is predominantly non-silicone.

31. A release coating comprising: the reaction product of:
(a) about 5 to about 50 percent by weight of a cationically reactive polydiorganosiloxane liquid rubber having the following formula:

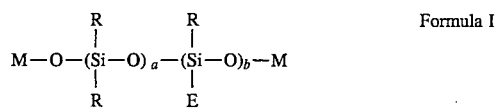

Formula I wherein
R are monovalent moieties which can be the same or different selected from the group consisting of alkyl and aryl, wherein at least about 50% of the total number of silicon atoms have two methyl groups bonded thereto;
E is an organic monovalent functional group comprising from about 1 to about 20 carbon atoms having at least one cationically co-reactive functional group;
a and b both represent integers, wherein the sum of a plus b is an integer of about 10 to about 1200;
b has a value ranging from about 0 to about 0.2a;
a is an integer of about 10 to 1000; and
M is a silyl group which must contain at least one cationically co-reactive functional group when b=0 and may contain at least one cationically co-reactive group when b is greater than 0;
(b) about 50 to about 95 percent by weight of at least one cationically co-reactive monomer copolymerizable with said cationically co-reactive functional group of said polydiorganosiloxane liquid rubber;

wherein the percentages of (a) and (b) are based on the total weight of (a) plus (b); and
(c) about 0.5 to about 4 parts by weight of a photoactive radiation activatable cationically reactive catalyst based on the weight of (a) plus (b); wherein said release coating has a release level of about 0.5 to 2.2 N/dm.

32. The release coating of claim 31 wherein the sum of a plus b is an integer of about 70 to about 200.

33. The release coating of claim 31 wherein the sum of a plus b is an integer of about 100 to about 150.

34. The release coating of claim 31 wherein said coating comprises about 5 to about 35 percent by weight polydiorganosiloxane liquid rubber and about 65 to about 95 percent by weight co-reactive monomer.

35. The release coating of claim 31 wherein R are monovalent moieties which can be the same or different selected from the group consisting of alkyl and aryl, wherein at least about 70% of the total number of silicon atoms have two methyl groups bonded thereto.

36. The release coating of claim 31 wherein said catalyst comprises an onium salt.

37. The release coating of claim 31 wherein said catalyst is selected from the group consisting of sulfonium salts, iodonium salts, and mixtures thereof.

38. The release coating of claim 31 wherein E is an organic monovalent functional group comprising from 1 to 10 carbon atoms having at least one cationically co-reactive functional group.

39. The release coating of claim 31 wherein E has 1 to 3 cationically co-reactive functional groups.

40. The release coating of claim 31 wherein said cationically co-reactive functional group(s) of E are selected from the group consisting of olefins, epoxy groups, mercapto groups, and vinyl ether groups.

41. The release coating of claim 31 wherein said cationically co-reactive functional group(s) of E are selected from the group consisting of epoxycyclohexylethyl groups and 3-mercaptopropyl groups.

42. The release coating of claim 31 wherein said cationically co-reactive monomer is selected from the group consisting of vinyl ethers, vinyl esters, phenyl substituted olefins, styrenes, olefins, epoxides, and mixtures thereof.

43. The release coating of claim 31 wherein said cationically reactive monomer is selected from the group consisting of limonene, pinene, camphene, vinyl toluene, t-butyl styrene, vinyl anisole, divinyl benzene, alpha-methylstyrene, anethole, propenyl phenol, diisopropenylbenzene, octadecyl vinyl ether, butanediol divinyl ether, cyclohexane dimethanol divinyl ether, vinyl 2-ethylhexanoate, divinyl adipate, 1-epoxy dodecane, styrene oxide, vinyl cyclohexane dioxide, butanediol digylcidyl ether, limonene oxide, limonene dioxide, and mixtures thereof.

44. The release coating of claim 31 wherein said cationically reactive monomer is selected from the group consisting of limonene, beta-pinene, 1,4-cyclohexanedimethanol divinyl ether, diisopropenyl benzene, and mixtures thereof.

45. The release coating of claim 31 wherein the top 0.005 micron of the coating is predominantly silicone.

* * * * *

UNITED STATES PATENT AND TRADEMARK OFFICE
CERTIFICATE OF CORRECTION

PATENT NO.: 5,576,356

DATED: November 19, 1996

INVENTOR(S): Charles M. Leir, William R. Berggren, William R. Bronn, David J. Kinning, and Olester Benson, Jr.

It is certified that error appears in the above-identified patent and that said Letters Patent is hereby corrected as shown below: On the title page:

Item [56] , under "References Cited U.S. Patent Documents", the following patent should be added --4,994,299   02/19/91   Stein et al.--; and Column 24, line 54, "cyclohexane" should read --cyclohexene--;

Signed and Sealed this

Ninth Day of November, 1999

Attest:

Q. TODD DICKINSON

Attesting Officer

Acting Commissioner of Patents and Trademarks